US007595915B2

(12) United States Patent
Belkhir

(10) Patent No.: US 7,595,915 B2
(45) Date of Patent: Sep. 29, 2009

(54) PAGE TURNING APPARATUS WITH A VACUUM PLENUM AND AN ADAPTIVE AIR FLUFFER

(75) Inventor: Lotfi Belkhir, Victor, NY (US)

(73) Assignee: Kirtas Technologies, Inc., Victor, NY (US)

(*) Notice: Subject to any disclaimer, the term of this patent is extended or adjusted under 35 U.S.C. 154(b) by 770 days.

(21) Appl. No.: 10/389,051

(22) Filed: Mar. 14, 2003

(65) Prior Publication Data

US 2003/0172795 A1 Sep. 18, 2003

Related U.S. Application Data

(60) Provisional application No. 60/364,889, filed on Mar. 15, 2002.

(51) Int. Cl.
*H04N 1/04* (2006.01)
*H04N 1/00* (2006.01)

(52) U.S. Cl. ....................... 358/474; 358/498; 358/497; 358/400

(58) Field of Classification Search ................. 358/474, 358/498, 497, 400, 501; 355/25; 399/362
See application file for complete search history.

(56) References Cited

U.S. PATENT DOCUMENTS

| | | | | |
|---|---|---|---|---|
| 2,065,011 | A | 12/1936 | McDowell | |
| 2,555,186 | A | 5/1951 | Demers | |
| 3,016,036 | A | 1/1962 | Jorgensen | |
| 3,484,970 | A * | 12/1969 | Berlinsky et al. | 40/531 |
| 3,550,296 | A | 12/1970 | Castagna | |
| 3,800,453 | A | 4/1974 | Kroes | |
| 3,816,646 | A | 6/1974 | Cinque | |
| 3,939,587 | A | 2/1976 | Weststrom | |
| 4,102,071 | A | 7/1978 | D'Arcy | |
| 4,121,361 | A | 10/1978 | D'Arcy | |
| 4,346,641 | A | 8/1982 | Kobayashi | |
| 4,432,154 | A | 2/1984 | D'Arcy | |
| 4,488,367 | A | 12/1984 | Yamauchi et al. | |
| 4,545,141 | A | 10/1985 | Ito et al. | |
| 4,566,683 | A | 1/1986 | Moore | |
| 4,644,675 | A | 2/1987 | Berger et al. | |
| 4,663,873 | A | 5/1987 | Shinbrot et al. | |

(Continued)

FOREIGN PATENT DOCUMENTS

DE 242884 1/1912

(Continued)

OTHER PUBLICATIONS

Prosecution History for U.S. Appl. No. 10/658,956 as listed in Public PAIR on Sep. 23, 2008.

(Continued)

*Primary Examiner*—Houshang Safaipour
(74) *Attorney, Agent, or Firm*—Basch & Nickerson LLP

(57) ABSTRACT

An apparatus for the turning of pages of a bound book, comprising a fixture to hold the book, a paper fluffer for blowing air between individual pages of the held book and displacing at least a top page of the held book upwardly, and an air plenum positioned above the top page of the book for grasping and turning the top page by application of a vacuum to the top page.

20 Claims, 4 Drawing Sheets

U.S. PATENT DOCUMENTS

| | | | |
|---|---|---|---|
| 4,673,286 A | 6/1987 | Shinbrot | |
| 4,831,457 A | 5/1989 | Watanabe et al. | |
| 4,899,214 A | 2/1990 | Robbins et al. | |
| 4,916,839 A | 4/1990 | Nakanishi | |
| 4,942,482 A | 7/1990 | Kajunuma et al. | |
| 5,247,755 A | 9/1993 | Sato et al. | |
| 5,325,213 A | 6/1994 | Takahashi et al. | |
| 5,351,927 A | 10/1994 | Howell | |
| 5,359,207 A | 10/1994 | Turner | |
| 5,390,033 A | 2/1995 | Bannai et al. | |
| 5,471,277 A | 11/1995 | Fujioka et al. | |
| 5,493,943 A | 2/1996 | Horikawa | |
| 5,610,720 A | 3/1997 | Fujioka et al. | |
| 5,612,791 A | 3/1997 | Turner et al. | |
| 5,640,252 A | 6/1997 | Turner et al. | |
| 5,777,660 A | 7/1998 | Ard | |
| 5,967,507 A | 10/1999 | Moore et al. | |
| 5,979,940 A | 11/1999 | Araghi | |
| 6,011,635 A | 1/2000 | Bungo et al. | |
| 6,056,258 A | 5/2000 | Swartz et al. | |
| 6,058,258 A | 5/2000 | Cullum et al. | |
| 6,181,432 B1 | 1/2001 | Furuya | |
| 6,186,492 B1 | 2/2001 | Dechaue et al. | |
| 6,246,188 B1 | 6/2001 | Funakoshi | |
| 6,264,188 B1 * | 7/2001 | Taylor et al. | 271/98 |
| 6,279,896 B1 * | 8/2001 | Linder et al. | 271/98 |
| 6,323,963 B1 | 11/2001 | Takahashi | |
| 6,398,206 B1 | 6/2002 | Yang et al. | |
| 6,398,208 B1 | 6/2002 | Yang et al. | |
| 6,459,505 B1 | 10/2002 | Swartz et al. | |
| 6,574,014 B2 | 6/2003 | Sollitt et al. | |
| 6,611,362 B2 * | 8/2003 | Mandel et al. | 358/474 |
| 2002/0186425 A1 | 12/2002 | Dufaux et al. | |
| 2004/0047009 A1 | 3/2004 | Taylor et al. | |
| 2006/0203244 A1 | 9/2006 | Nilson et al. | |
| 2006/0215038 A1 | 9/2006 | Gruber et al. | |
| 2008/0316551 A1 | 12/2008 | Taylor et al. | |

FOREIGN PATENT DOCUMENTS

| | | |
|---|---|---|
| DE | 1561371 | 2/1970 |
| EP | 0 427 898 | 5/1991 |
| EP | 0 779 534 | 6/1997 |
| FR | 2 757 797 | 7/1998 |
| GB | 1 269 021 | 3/1972 |
| GB | 2 010 229 | 6/1979 |
| JP | 61228995 | 10/1986 |
| JP | 818744 | 1/1996 |
| WO | WO03016072 A1 | 2/2003 |

OTHER PUBLICATIONS

Prosecution History for U.S. Appl. No. 12/143,072 as listed in Private PAIR on Sep. 23, 2008.

International Search Report and Written Opinion of PCT/US08/67681 transmitted Aug. 15, 2008.

Office Action for Japanese patent application 2004536462.

Partial file history for U.S. Appl. No. 10/658,956.

Partial file history for U.S. Appl. No. 12/143,072.

Partial file history for U.S. Appl. No. 12/353,753.

An International search report for PCT patent application PCT/US09/31040 which corresponds to pending U.S. Appl. No. 12/353,753.

* cited by examiner

PAGE TURNING APPARATUS WITH A VACUUM PLENUM AND AN ADAPTIVE AIR FLUFFER

CROSS-REFERENCE TO RELATED PATENT APPLICATIONS

This application claims the benefit of the filing date of U.S. provisional patent application Ser. No. 60/364,889 filed Mar. 15, 2002.

This invention relates generally to a page turning apparatus for use with a book scanning or digitizing system, and more particularly to a page separation mechanism employing a vacuum plenum and corrugated surface thereon.

BACKGROUND AND SUMMARY OF THE INVENTION

The present invention is directed to the application of a vacuum plenum having a corrugated surface as an aid to the separation and turning of pages in an open-book scanner. Scanners of the type in which the present application find a particular use are described, for example, in the U.S. Pat. Nos. 6,056,258, 5,640,252 and 5,359,207, the disclosures of which are incorporated herein by reference.

Heretofore, a number of patents have disclosed apparatus and methods of displacing individual sheets of paper from a paper stack and acquiring and moving such sheets of paper. The relevant portions of these patents may be briefly summarized as follows:

U.S. Pat. No. 6,264,188, of Taylor et al, issued Jul. 24, 2001, discloses a sheet feeding apparatus having an adaptive air fluffer. The disclosure of this United States patent is incorporated herein by reference. The apparatus comprises a sheet tray for holding a stack of paper sheets, a fluffer for blowing air at the edge of the stack of sheets and displacing an upper sheet upwardly therefrom, an air plenum positioned above the stack of sheets for acquiring the displaced upper sheet of paper and subsequently transporting it to a second location. The paper fluffer is able to adjust air flow between individual sheets in the stack, and includes a support structure, and a plate pivotally mounted in the support structure. The plate has a venturi plate portion in contact with the sheet, and a regulating plate portion with an aperture therein which permits air to pass therethrough, and with a cross sectional area that limits air flow as the sheet moves in contact with the air plenum while pivoting the plate.

In the process of book scanning, a digital image of to be to be scanned or copied is typically obtained by digitizing or imaging the book in an open state. It will be appreciated that while various problems are known in the process of book scanning (e.g., page flatness/depth-of-focus, page turning, book spine handling, etc.) the present invention is directed to an improved apparatus and method for the automated turning of pages in an open book. Although sheet handling system, and the use of vacuum sources are known in high-speed xerographic applications (e.g., U.S. Pat. No. 6,264,188), the present invention is directed to the use of similar technology to assure reliable movement of pages in an open book, where the quality and type of material that the pages are made from varies considerably, both from book-to-book and even from page-to-page. The page handling systems must operate flawlessly to virtually eliminate risk of damaging the pages and generate minimum machine shutdowns due to misfeeds or multifeeds. It is in the initial separation of the individual page from the remaining pages where the greatest numbers of problems occur. Many of the problems to be overcome by an apparatus for the turning of book pages, that is adaptable to a wide range of book sizes, shapes, bindings, and paper properties thereof are further described and illustrated in applicant's co-pending provisional application No. 60/409,399, the disclosure of which is incorporated herein by reference.

It is therefore an object of this invention to provide a book page turning apparatus that can attach to and turn in sequence every page of a book regardless of the relative quality and type of material that such book pages are made from.

It is an object of this invention to provide a book page turning apparatus that can attach to and turn in sequence every page of a book regardless of the book size, shape, and binding structure.

It is a further object of this invention to provide a book page turning apparatus that can attach to and turn in sequence every page of a book, beginning with a selected first page and ending with a selected final page, without interruption due to page misfeeds or multifeeds.

It is an object of this invention to provide a book page turning apparatus that can attach to and turn in sequence every page of a book, without damaging the book.

In accordance with the present invention, there is provided a page turning apparatus for turning at least a top page of a stack of pages in a book, wherein said pages are bound along an edge thereof, comprising: means for holding said book; and an air plenum, positioned above said top page, for picking up said top page when a vacuum is applied to said plenum; and means for moving said air plenum, between a first page location and a second page location so that said top page is turned. The present invention may further comprise a paper fluffer for blowing air between individual pages of said book, said paper fluffer comprising means for adjusting air flow between individual pages, and a regulating plate portion comprising an aperture defined therein that permits air to pass therethrough, said aperture having a cross-sectional area that limits air flow as said top page moves in contact with said air plenum.

In accordance with the present invention, there is further provided a page turning apparatus for turning at least a top page of a stack of pages in a book, wherein said pages are bound along an edge thereof, comprising: means for holding said book; a paper fluffer for blowing air between individual pages of the book to assist in the separation thereof; and an air plenum, positioned above said top page of said book, for picking up said page when a vacuum is applied to said plenum, said plenum further comprising means for adjusting air flow between said individual pages; a corrugated surface for contacting at least a portion of said top page, wherein said corrugated surface includes a combination of varying sized ribs to reduce bonding forces between said top page and subsequent page surfaces thereby separating pages; and a flexible seal, disposed around the perimeter of said air plenum wherein said flexible seal is contoured to engage said top page as said top page progressively corrugates.

In accordance with the present invention, there is further provided a method for automatically turning the top page of an open book, comprising the steps of supporting said book in an open position; moving an air plenum into proximity with a top page of said book; applying a vacuum to said air plenum so as to cause at least said top page to be attracted thereto; moving said air plenum from a first position in proximity to said top page to a second position toward an opposite page; and releasing said vacuum to said air plenum so as to cause said top page to fall to a position on top of said opposite page, thereby turning said top page.

The apparatus and methods presently described are advantageous because they are capable of being adapted to a wide range of books for which it is desired to either view or record images seriatim of the pages therein. In particular, the apparatus of the present invention is capable of reliably separating and turning the pages of a book, and in accommodating the wide variations in geometry between books, as they are held and processed by the apparatus. As a result of the invention, repositories of large volumes of books will have an automated device to assist in the recording, archiving, and distributing the information contained in such books held in such libraries.

BRIEF DESCRIPTION OF THE DRAWINGS

The invention will be described by reference to the following drawings, in which like numerals refer to like elements, and in which.

Figure 1:
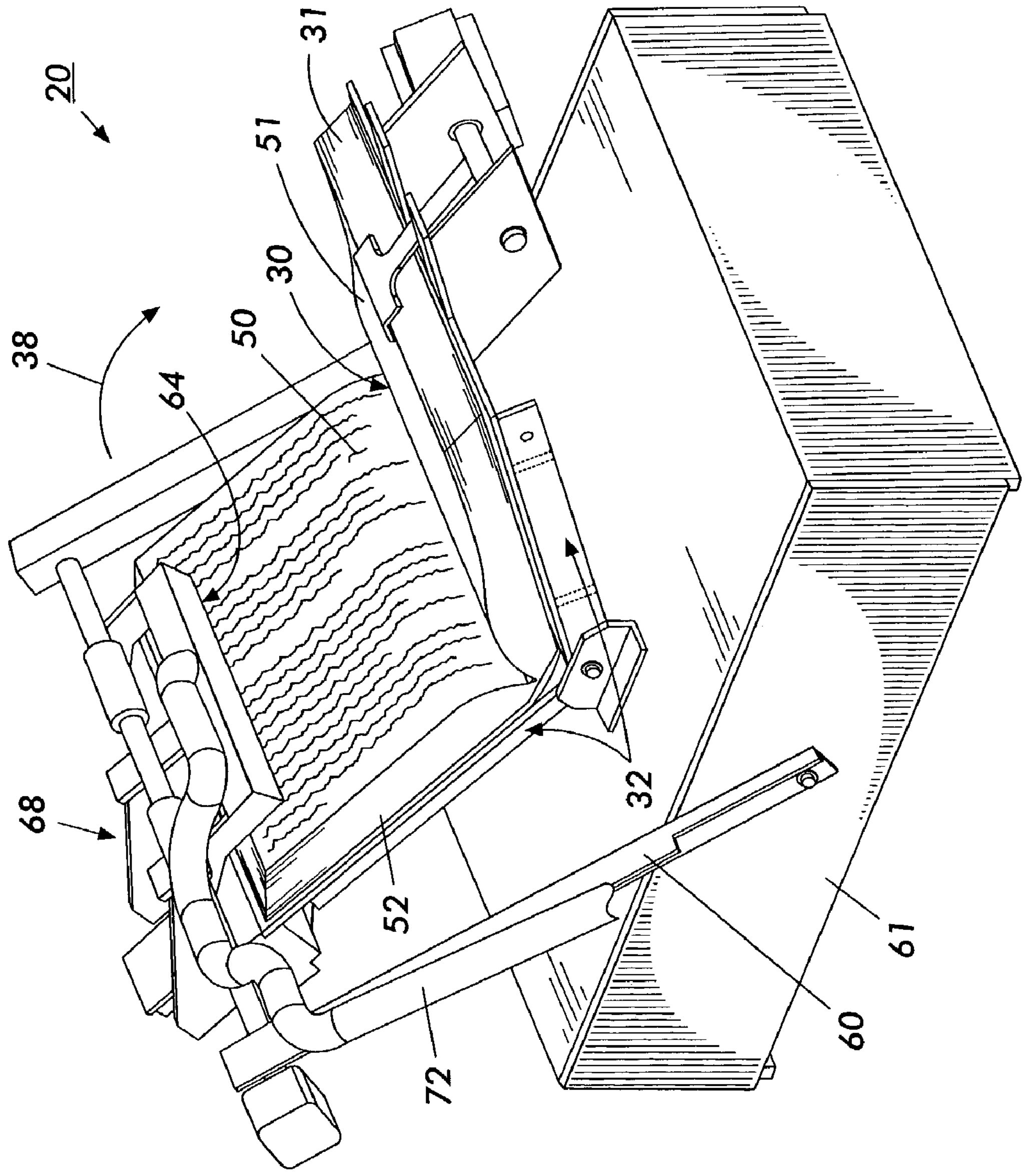
FIG. 1 is a perspective view of a page turning system suitable as an embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements.

By way of a general explanation, FIG. 1 is a perspective view showing an embodiment of a page-turning device 20 that incorporates features of the present invention. It will become evident from the following discussion that the present invention is equally well suited for use in a wide variety of page turning systems, and is not necessarily limited in its application to the particular system shown herein. As shown in FIG. 1, during operation of the printing system, a book 30 is positioned on a generally V-shaped support, indicated by the reference numeral 32. In one embodiment, the page-turning device may be combined with a digital camera or digitizing device (not shown) suitable for capturing an image of the pages of the book as or after they are turned. Such a system may further include page illumination lamps, optics, a scanning drive, and a scanning array, or other digital or analog image recording means. Such a system is described in detail in applicant's provisional patent application U.S. Ser. No. 60/409,399, the disclosure of which is incorporated herein by reference.

As will be appreciated, the turning of the top page of the book, in the direction indicated by arrow 38, is performed successively so as to allow the capture of an image of each page. Furthermore, due to the widely varying page types and conditions encountered in such books (e.g., scanning of the majority of books in a library collection) the page turning system 20 must be able to not only reliably handle such pages, but do so without damage to the pages as well.

The present invention contemplates the turning of a top page 50 using an articulating arm 60, where the arm would swing once a page had been attracted to the vacuum plenum 64. In one embodiment, the vacuum plenum is assisted through the use of a fluffer 68, wherein the fluffer is disposed along the edge of the book and is able to eject air so as to disturb the page edges as the top page 50 is being attracted to the plenum. Once the page is grasped by the vacuum applied to plenum 64, perhaps detected by a sensor (e.g., optical sensor, vacuum pressure sensor, etc.), the page is turned in the direction indicated by arrow 38 and the vacuum is concurrently reduced so as to assure that the page is not pulled or torn by the plenum. In a further embodiment, a sensing means detects the onset of a loss in vacuum due to the page beginning to loosen from the plenum, and a stronger vacuum is applied to the plenum to maintain the page in contact with the plenum.

Figure 2:
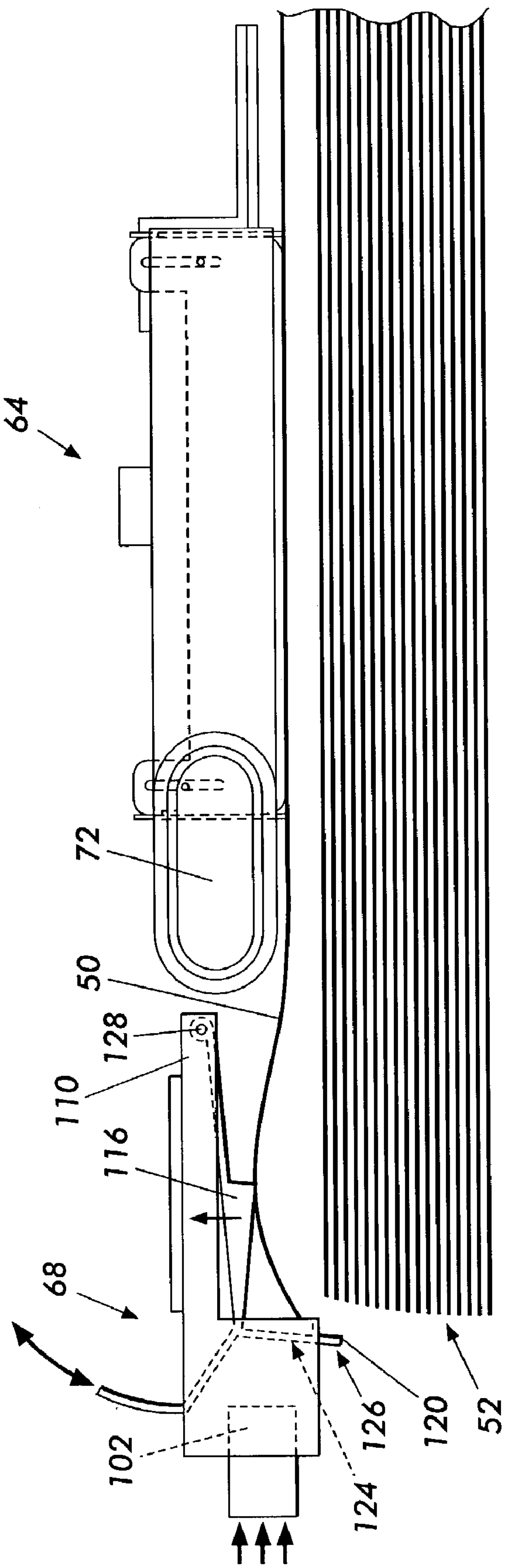
FIG. 2 is a side view of a paper fluffer and vacuum plenum in accordance with the embodiment of FIG. 1.
Figure 3:
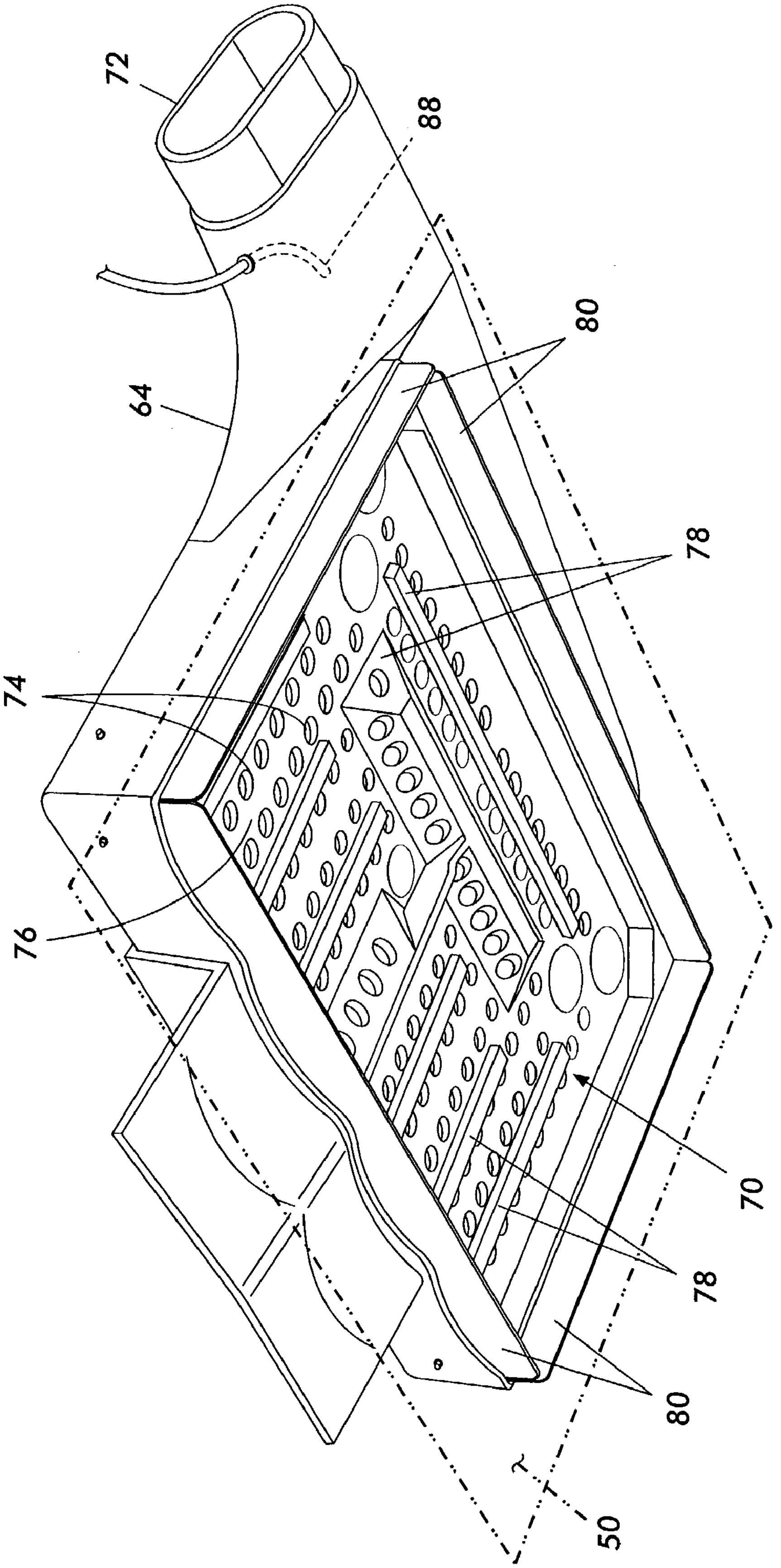
FIG. 3 is a perspective view of the bottom of a vacuum plenum in accordance with the embodiments of FIGS. 1 and 2.

Further details of the construction and operation of the page turning system, and in particular the vacuum plenum 64 and fluffer 68 of the present invention, are provided below with reference to FIGS. 2 and 3. Referring to FIGS. 2 and 3 in conjunction with FIG. 1, there is shown an adaptive fluffer 68. Adaptive fluffer 68 has an air inlet opening 102, which is operatively connected to a pressurized air supply source (not shown). The adaptive fluffer 68 is arranged such that it may eject air so as to drive some air between the book pages along edge 52 and on the top surface of the top page to be turned. The air injected between pages assists with the separation of the pages (i.e., puffs the edge of the pages up). At the same time, the ejected air traveling across the top of page 50 creates, due to a Venturi effect, a vacuum to help pull the page 50 toward the vacuum plenum 64. The combined effects of the fluffer 68 are believed to improve the speed of the page separation and thereby facilitate faster turning as well as ensure only a single page is fed.

Fluffer 68 comprises support structure 110 and a Venturi plate portion 116 and regulating plate portion 120. Regulating plate portion 120 has an area 124 that permits air to pass therethrough toward book edge 52, and a cross-section area 126 that restricts air flow. Before a page is fluffed, the Venturi plate portion 116 is flat against the top sheet 50. When sheet 50 is fluffed, such upwardly displaced sheet 50 lifts up the Venturi plate portion 116, thereby pivoting the regulating plate 120 of the fluffer 68 around pin 128, and a corresponding pin (not shown) located on the opposite side of fluffer 68. The pivoting motion causes the solid cross-section area 126 of regulating plate portion 120 to limit the airflow.

In the embodiment depicted, the Venturi plate 116 is angled relative to support structure 110 so that whatever height the pages are at there remains a gap that maintains the airflow on the book edge to be consistent as the height of the pages changes. Both of these effects regulate the amount of fluffing to prevent over fluffing and keeps pages from being packed near the top page 50. This obviates the problem of pages being packed at the top of the fluffed pages. This problem is more acute in the regular fluffer system for lightweight pages; as it may result in multifeeds. When the sheet 50 is moved out of contact with Venturi plate portion 116, by plenum 64, plate 116 moves back down until it contacts the next page to be turned.

Referring again to FIGS. 2 and 3, air plenum 64 is located above the pages 52. The air plenum 64 includes a cavity 70 which may be evacuated by a vacuum source (not shown) attached to outlet tube 72, thereby forming a pressure differential. The vacuum paper contact surface of the air plenum 64 includes a series of small openings 74. In operation, air flows from cavity 70, through small openings 74, and into the inside of air plenum 64, and then out through outlet tube 72, by the action of the vacuum source (not shown). Thus cavity 70 and small openings 74 are in communication with outlet tube 72 of air plenum 64.

The difference in pressure between the inside of the air plenum 64 and the outside of such feeder plenum 64 forces or attracts the top page 50 toward the vacuum paper contact surface 76 of the feeder plenum 64. Paper contact surface 76 is preferably a corrugated surface comprising a combination of varying sized ribs 78 to reduce the bonding forces between page surfaces thereby separating pages on said vacuum paper contact surface 76.

Seal 80, positioned around the perimeter of plenum 64, is a "floating" and flexible seal between the air plenum and pages. An advantage of seal 80 is its adaptability, where it bridges the gap between the air plenum and the top page while not inhibiting the fluffing of the pages as previously described. Seal 80 is contoured to the non-flat conditions of the pages as the pages are drawn thereto. Seal 80 is also able to contour about a page as the top page is corrugated against the air plenum ribs 78 on the interior of the plenum. Seal 80 is preferably sufficiently rigid so as not to be drawn into the air plenum cavity 70.

Sealing the air plenum 64 to the page being acquired has the added advantage that the fluffing air flow does not feed air into the air plenum and make it difficult to create the vacuum required to acquire such page for turning. In yet another embodiment, it is contemplated that the seal 80 may be movable relative to the plenum or may be a contoured seal that fits the shape of the corrugated surface. A seal including such features would allow the plenum to apply the full vacuum pressure to the page with little or no leakage, thereby lifting the page (the fluffer also assists) until it is drawn into contact with the plenum 64. At this time the page may begin to corrugate around the fixed ridge pattern of the plenum box. To control the plenum box pressure, it is also possible to design the seals 80 to provide a controlled amount of leakage therethrough. The seals are preferably contoured to engage the sheet as it progressively corrugates, yet providing the appropriate leakage to reduce the pressure for lighter weight sheets as is taught in U.S. Pat. No. 6,264,188.

The material of construction of such seals preferably has a low coefficient of friction with itself and with the material of the plenum body, a high degree of flatness, is lightweight, and is sufficiently rigid so as to resist deformation due to the pressure differential between the ambient external environment and the cavity of the plenum. In one embodiment, such seals were made of polyethylene terephthalate (Mylar®) shim stock.

Referring again to FIG. 3, air plenum 64 further comprises sensing means to detect the acquisition and sealing of a page thereto. In one embodiment (not shown), sensor means comprises an optical sensor, which detects and confirms that the page is proximate to plenum 64. In the embodiment depicted in FIG. 3, sensing means comprises an air flow or air pressure or vacuum sensor 88 disposed within the interior of plenum 64. Sensor 88 may be a strain gage type vacuum sensor, a pitot tube, or a tube connected remotely to a pressure-to-current transducer (not shown). In an alternate embodiment, sensor 88 may comprise a hot wire anemometer that detects air flow velocity. It is known that air flow within a plenum is easily correlated with vacuum or pressure within a plenum, such that an air flow sensor is functionally equivalent to a vacuum or pressure sensor. It will be apparent that numerous other sensing means that detect air pressure, vacuum, and/or flow rate will be suitable.

In operation, sensor 88 is connected to a controller (not shown), and such controller is further connected to a vacuum source (not shown) that is evacuating plenum 64 through outlet tube 72. The controller is programmed with a feedback control loop, so that the vacuum within plenum 64 is modulated so as to prevent damage to the acquired page, such as wrinkling or tearing. In the event that a loss of vacuum is detected, indicating the onset of a loss of the acquired page, the controller increases the setpoint of the vacuum source, thereby maintaining the page in an acquired state to plenum 64.

It will be apparent that the location shown of sensor 88 within plenum 64 is for illustrative purposes only, and that many other locations within plenum 64 would be suitable. In an alternate embodiment, sensor 88 is located within cavity 70 of plenum 64, located such that sensor 88 does not interfere with the acquisition of a page. For example, sensor 88 may be located in proximity to a rib 78, where such sensor would not be contacted by the acquired page.

In accordance with one embodiment of the present invention, when the top sheet is acquired, concentrated shear forces, (P1, P2 and P3 as is disclosed in U.S. Pat. No. 6,264,188), will be generated due to the corrugating ribs 78 in the plenum, and these forces will produce shear stress over the cross-section of the paper along the paper thickness direction. As a result, the shear stress in the vertical direction (the page thickness direction) will be equivalent to the shear stress in the horizontal direction (along the page surface); the shear stress at the center of the beam thickness will be the highest and its value will be inversely proportional to the thickness. Because the beam thickness of the acquired pages is small, a concentrated shear force will generate a large shear stress. Thus, if more than one page is acquired, the shear stress will work to slide the page over the surface of pages beneath. A gap between the pages is therefore initiated if the strength of the paper bond at those stressed locations is weaker than the sliding force. Besides producing a shear force, bending of the page also helps initiate gaps between the pages. When a beam is bent, the upper and lower parts of the beam undergo different kinds of deformation; one part is in expansion and the other in compression. Therefore, if a plurality of pages are bent simultaneously, the bending motion will help separate the pages.

Referring again to FIG. 1, at such time as the top page 50 has been acquired by air plenum 64, air plenum 64, attached to upper end of articulating arm 60, is then swung horizontally by articulating arm 60 in an arcuate trajectory as indicated by arcuate arrow 38. Articulating arm 60 is pivotally attached at a lower end thereof to base 61 of apparatus 20, and is operated by drive means (not shown), which is operatively engaged with articulating arm 60. Such drive means is described in detail in applicant's aforementioned provisional patent application U.S. Ser. No. 60/409,399. Top page 50 is thus "turned", i.e. conveyed to the opposite stack 31 of pages of the book 30. As top page 50 is moved to a position nearly contiguous with stack 31 of pages, the vacuum applied to air plenum 64 is released, thereby releasing the newly turned page 50, so that newly turned page 50 becomes the top page 51 of stack 31.

Figure 4:
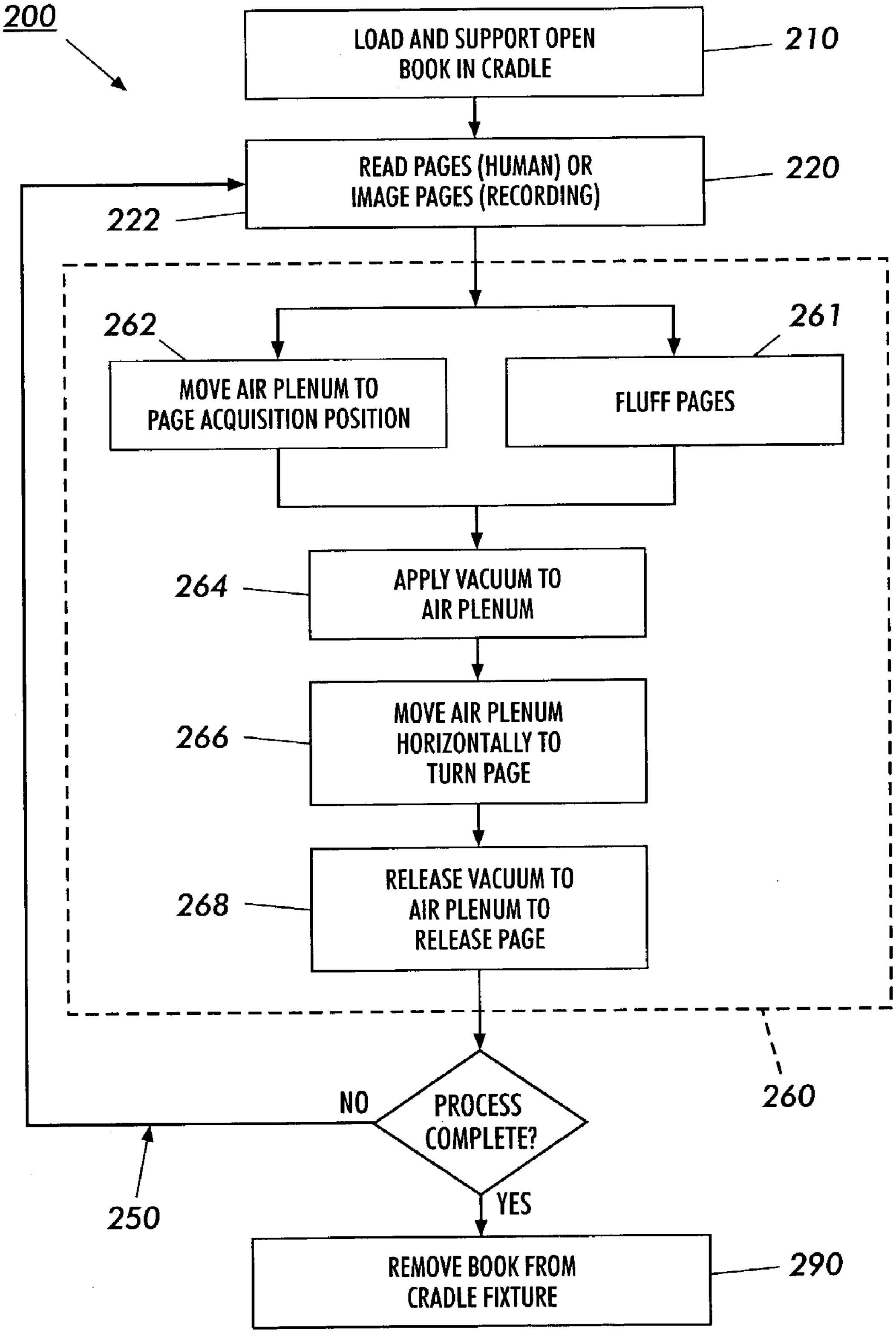
FIG. 4 is a flow chart that depicts a method of the present invention to turn pages of the book, using the apparatus of the present invention.

FIG. 4 is a flow chart that depicts stepwise a method of the present invention to turn pages of the book, using the apparatus of the present invention depicted in FIGS. 1-3. Referring initially to FIG. 1 and FIG. 4, the first step 210 of method 200 is the loading and supporting of a book 30 in a generally V-shaped support or cradle 32. With such book 30 open and supported, and the first pages of interest presented, in step 220, such pages may be read by a human (not shown). Alternatively, an image of such pages may be recorded by analog or digital recording means as described in applicant's aforementioned provisional patent application U.S. Ser. No. 60/409,399.

Subsequently, in step 262, articulating arm 60 moves air plenum 64 proximate to top page 50 of book 30, as shown in FIG. 1, whereby air plenum 60 is positioned to acquire page 50. Referring to FIG. 2, in a preferred embodiment further comprising step 261, fluffer 68 is also supplied with air into inlet 102 thereof, thereby "fluffing" or displacing top page 50 upwardly toward air plenum 64, as previously described. Vacuum is then applied to air plenum 64, and top page 50 is acquired by air plenum 64.

Referring again to FIG. 1 and FIG. 4, air plenum 64 is then swung horizontally in step 266 by articulating arm 60 as indicated by arcuate arrow 38. During this motion, in one embodiment, a sensor 88 (see FIG. 3) within plenum 64 is used to detect the presence of vacuum therein. In the event that such vacuum exceeds a first programmed setpoint, indicating potential damage to the acquired page, a controller reduces the level of vacuum within plenum 64. In the event that such vacuum drops below a second programmed setpoint, indicating potential loss of the acquired page from the plenum, a controller increases the level of vacuum within plenum 64, thereby retaining the acquired page.

When top page 50 is in a position nearly contiguous with stack 31 of pages, the vacuum applied to air plenum 64 is released in step 268, thereby releasing the newly turned page 50 as previously described. If the reading or recording of the pages of book 30 is not complete, as indicated by path 250, the process continues with the repetition of step 220, and the steps of the entire page turning cycle 260, until such reading or recording of book 30 is complete. At such time, book 30 is removed from cradle 32 in step 290.

It is to be understood that steps 210-290 of FIG. 4 are depicted serially for the sake of simplicity of illustration. It will be apparent that certain of steps 210-290 may overlap in time to some extent, thereby optimizing the performance and throughput of applicant's page turning apparatus 20.

It is to be further understood that the applicant's page turning apparatus has further utility in the handling of other delicate sheet materials comprising at least one sheet of material disposed on a surface, and attached to or contacting such a surface at one end. For example, the page turning apparatus of the present invention may be used in the handling of sheets of fabric in the sewn products industry. In another embodiment, the page turning apparatus could be used to handle thin sheets of metal foil, without crinkling or tearing such foil. In another embodiment, the page turning apparatus could be used to handle samples of film such as e.g. photographic film in a development operation.

In another embodiment, the page turning apparatus of the present invention may be adapted to medical procedures. For example, in a surgical operation, where there is a need to gently and aseptically displace a flap of skin or other tissue without contact by the surgeon, the apparatus of the present invention could be used to lift and hold such skin or tissue, and then replace it at the conclusion of surgery. Numerous other uses of the page turning apparatus of the present invention will be apparent to those skilled in the art.

It is, therefore, apparent that there has been provided, in accordance with the present invention, a method and apparatus for the turning of pages, wherein the pages may be separated with an air fluffer and acquired for turning using a vacuum, corrugated plenum. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A page turning apparatus for turning at least a top page of a stack of pages in a book, wherein said pages are bound along an edge thereof, comprising:

a) means for supporting said book; and b) an air plenum, positioned above said top page, said air plenum including a plurality of varying size ribs for corrugating said top page to aid with separation and picking up said top page for turning when a vacuum is applied to said plenum; and c) means for swinging said air plenum, between a first page location and a second page location, so that said top page is turned and releasing the vacuum applied to said plenum to release said top page.

2. The page turning apparatus of claim 1, further comprising a paper fluffer located along an outer edge of the book opposite the binding, for blowing air between individual pages of said book, said paper fluffer comprising:

a) means for adjusting air flow between the outer edge of said individual pages; and b) a regulating plate portion comprising an aperture defined therein that permits air to pass therethrough, said aperture having a cross-sectional area that limits air flow as said top page moves in contact with said air plenum.

3. The page turning apparatus as recited in claim 1, wherein said air plenum further comprises a cavity, and a paper contact surface including a plurality of openings.

4. The page turning apparatus as recited in claim 1 wherein at least two of said varying sized ribs are parallel to each other.

5. The page turning apparatus as recited in claim 1 wherein at least two of said varying sized ribs are perpendicular to each other.

6. The page turning apparatus as recited in claim 1 wherein at least two of said varying sized ribs are of unequal height in a direction perpendicular to said paper contact surface.

7. The page turning apparatus as recited in claim 3 wherein said air plenum further comprises an outlet tube that is in communication with said plurality of openings and with said cavity.

8. The page turning apparatus as recited in claim 7 wherein said air plenum further comprises a perimeter, and a flexible seal disposed around said perimeter.

9. The page turning apparatus as recited in claim 8 wherein said seal is contoured to said top page acquired thereto.

10. The page turning apparatus as recited in claim 3 wherein said air plenum further comprises vacuum sensing means disposed therein.

11. The page turning apparatus as recited in claim 10, wherein said air plenum further comprises an outlet tube that is in communication with said plurality of openings and with said cavity, and wherein said vacuum sensing means is disposed in said outlet tube.

12. The page turning apparatus as recited in claim 1 wherein said apparatus further comprises a base, and wherein said means for swinging said air plenum comprises an articulating arm comprised of an upper end and a lower end, said lower end of said articulating arm is attached to said base of said apparatus, and said air plenum is attached to said upper end of said articulating arm.

13. The page turning apparatus as recited in claim 1, wherein said apparatus further comprises a base, and wherein said means for supporting said book comprises a V-shaped support disposed upon said base.

14. A page turning apparatus for turning at least a top page of a stack of pages in a book, wherein said pages are bound along an edge thereof, comprising:

a) means for supporting said book;

b) a paper fluffer, located along an outer edge of the book opposite the binding, for blowing air between individual pages of said book to assist in the separation thereof; and c) an air plenum, positioned above said top page of said book, for picking up said page when a vacuum is applied to said plenum, said plenum further comprising:

(1) means, associated with said air plenum, for adjusting air flow between said individual pages;

(2) a corrugated surface for contacting at least a portion of said top page, wherein said corrugated surface includes a combination of varying sized ribs to reduce bonding forces between said top page and subsequent page surfaces thereby corrugating said top page to aid with separating the top page from subsequent pages of the book; and (3) a flexible seal, disposed around the perimeter of said air plenum wherein said flexible seal is contoured to engage said top page as said top page progressively corrugates.

15. A method for automatically turning the top page of an open book, comprising:

a) supporting said book in an open position;

b) moving an air plenum into proximity with a top page of said book, said plenum including a plurality of varying size ribs adjacent the top page;

c) applying a vacuum to said air plenum so as to cause at least said top page to be attracted thereto, thereby drawing the top page into contact with the plurality of varying size ribs in the plenum and corrugating said top page to aid with separation from book pages beneath the top page;

d) swinging said air plenum from a first position in proximity to said top page to a second position toward an opposite page; and e) releasing said vacuum to said air plenum so as to cause said top page to fall to a position on top of said opposite page, thereby turning said top page.

16. The method of claim 15, further comprising the step of engaging an air source to a paper fluffer located adjacent the end of the at least said top page so as to cause said top page to be separated from pages therebelow and attracted to the air plenum.

17. The method of claim 15, further comprising the step of reducing the vacuum applied to said air plenum concurrently with swinging said air plenum from said first position to said second position.

18. The method of claim 15, further comprising the step of increasing said vacuum to said air plenum concurrently with said swinging said air plenum from said first position to said second position.

19. The method according to claim 18, further comprising subsequently decreasing the vacuum applied to said air plenum as the top page is moved to a position nearly contiguous with a stack of pages to which it is being turned.

20. The method of claim 15, wherein while swinging said air plenum from the first position to the second position, the vacuum is generally maintained below a first setpoint, to avoid damage to the acquired page, and above a second setpoint, to avoid loss of the acquired page from the plenum.

* * * * *